United States Patent [19]

Fodor

[11] 4,270,400
[45] Jun. 2, 1981

[54] CONTINUOUSLY VARIABLE TRACTION DRIVE TRANSMISSION

[76] Inventor: Eben V. Fodor, 3611 35th St., NW., Washington, D.C. 20016

[21] Appl. No.: 123,730

[22] Filed: Feb. 21, 1980

[51] Int. Cl.³ .............................................. F16H 15/08
[52] U.S. Cl. .......................................... 74/194; 74/208
[58] Field of Search .......................... 74/194, 196, 208

[56] References Cited

U.S. PATENT DOCUMENTS

| | | |
|---|---|---|
| 652,006 | 6/1900 | Rantz ..................................... 74/194 |
| 1,081,954 | 12/1913 | Green ..................................... 74/194 |
| 3,323,384 | 6/1967 | Wodarka . |
| 3,464,281 | 9/1969 | Azuma et al. . |
| 3,739,658 | 6/1973 | Scheiter . |
| 3,875,814 | 4/1975 | Steuer . |
| 4,137,785 | 2/1979 | Virlon . |

*Primary Examiner*—Kenneth Dorner
*Attorney, Agent, or Firm*—Roylance, Abrams, Berdo & Farley

[57] ABSTRACT

A continuously variable traction drive transmission comprising a rotating disc mounted on a first shaft and a roller in frictional contact with the face of the disc, the roller being axially movable along a second shaft and thereby radially movable along the disc face to vary the relative rotational speeds of the disc and roller. This axial movement is automatically accomplished by pivotally supporting an end of the second shaft and providing a controlled translation to the other end of the second shaft. A mechanism for controlling the contact pressure between the disc face and the roller is also provided. The transmission has low frictional losses and is therefore highly efficient and has a long service life.

16 Claims, 4 Drawing Figures

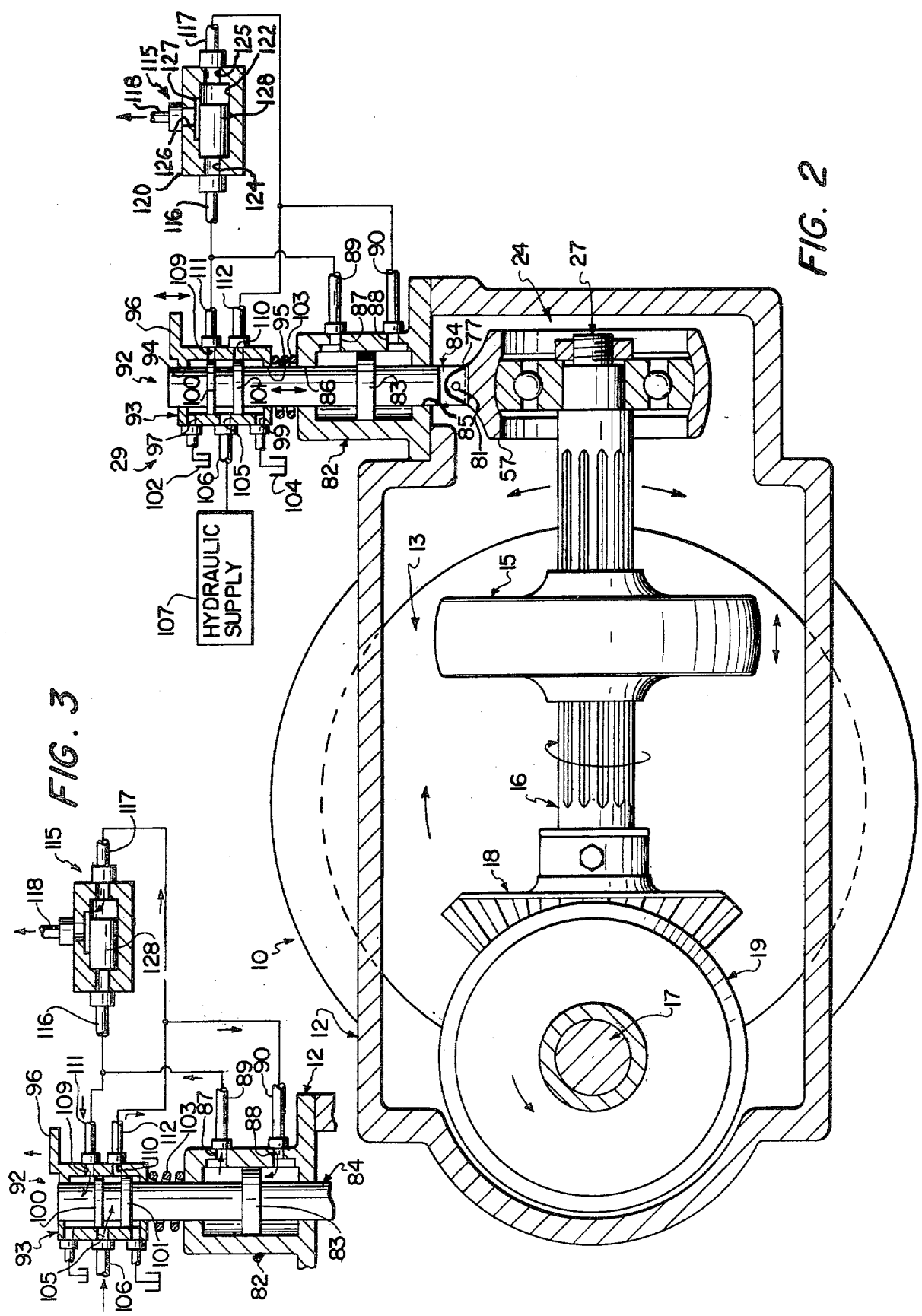

CONTINUOUSLY VARIABLE TRACTION DRIVE TRANSMISSION

FIELD OF THE INVENTION

The present invention relates to a continuously variable traction drive transmission including a rotating disc and a roller in frictional contact with the disc. The roller moves axially along a shaft, and radially along the disc, to vary rotational speeds between a shaft coupled to the disc and another shaft coupled to the roller shaft. The roller shaft is pivoted about a transverse axis to change the axial position of the roller, thereby effectuating the speed change, and is coupled to a mechanism for controlling the contact pressure between the roller and the disc, thereby reducing wear and improving efficiency.

BACKGROUND OF THE INVENTION

The shortage and high price of gasoline has recently led to an intensified search for a more efficient automobile. In this regard, the ability to store braking energy in a usable form has shown great promise. One of the best ways for recovering and storing the energy usually lost in the braking mode is in a spinning flywheel. A vehicle equipped with a flywheel energy storage system is thus capable of sophisticated energy management and substantial improvement in fuel economy.

Probably the single greatest obstacle to utilization of flywheel energy storage has been the lack of a suitable transmission. In order to match the speeds of a spinning flywheel to those of the automobile drive train, a continuously variable transmission with a wide speed ratio range is required.

A number of transmissions have been designed to meet this need but they have been far from perfect in their application to the automobile. An automobile makes certain demands on a transmission, among which are high torque capabilities, efficient power transfer, and long service life. In addition, the control system must be suitable for simple operation. Previous designs have had major drawbacks in one or more of these areas.

Particularly, prior art in continuously variable transmissions have lacked the ability to transfer power efficiently from one shaft to the other and energy lost in the automobile transmission can greatly reduce the performance of the vehicle.

Many of these continuously variable transmissions are of the traction or frictional gearing type in which the speed ratios of an input and an output shaft are varied by moving a roller across the planar face of a disc, where the disc and the roller are separately coupled to an input and an output shaft. Traditionally, the roller is mounted on a shaft for axial movement which also results in radial movement across the face of the disc, thereby changing the speed ratios therebetween.

Such prior art devices are disclosed in U.S. Pat. No. 3,323,384, issued to Wodarka on June 6, 1967; U.S. Pat. No. 3,464,281, issued to Azuma et al on Sept. 2, 1969; U.S. Pat. No. 3,739,658, issued to Scheiter on June 19, 1973; U.S. Pat. No. 3,875,814, issued to Steuer on Apr. 8, 1975; and U.S. Pat. No. 4,137,785, issued to Virlon on Feb. 6, 1979.

These prior art continuously variable transmissions are very low in efficiency and have short service lives because of frictional losses and wear between the various moving parts, especially between the roller and the disc. In particular, many of these devices, in order to avoid slippage between the roller and the disc, overload the contact point therebetween, thereby increasing the friction, resulting in losses of power and excessive wear which can be destructive to both parts. In addition, many of these devices require various gearing mechanisms to control the location of the roller relative to the disc face, thereby also incurring additional frictional losses of power and excessive wear. On the other hand, many of these devices in an attempt to reduce the frictional losses between the roller and the disc reduce the contact pressure therebetween, which, unfortunately, oftentimes leads to excessive slipping between the roller and the disc. Such slippage reduces the transmission of power through the transmission and ultimately results in low efficiency. In addition, many of these devices are capable of transmitting power in only one direction so they are not totally suitable to use in hybrid energy-storage vehicles.

SUMMARY OF THE INVENTION

Accordingly, it is a primary object of the present invention to provide a continuously variable transmission which is high in efficiency and has a long service life.

Another object of the present invention is to provide such a transmission which reduces frictional power losses and excessive wear in controlling the relative position of a roller and disc.

Another object of the present invention is to provide such a transmission which reduces frictional power losses and wear with regard to the contact pressure between a roller and disc in the transmission.

Another object of the present invention is to provide such a transmission in which power can be transmitted in two directions and where slippage of the frictionally engaged roller and disc is prevented.

Another object of the present invention is to provide such a transmission in which the speed ratio control allows for the flexibility desirable in an automobile.

Another object of the present invention is to provide such a transmission which operates by traction drive and is capable of transmitting large torques in high power applications.

The foregoing objects are basically attained by providing in a continuously variable transmission of the type having a frame; a disc having a planar face; a first shaft rigidly coupled to the disc; means for coupling the first shaft to the frame for rotation about a fixed axis; a second shaft; a roller coupled to the second shaft for rotation therewith, the roller being axially movable along the second shaft; means, coupled to the frame, for rotatably supporting the second shaft, the roller thereon being in frictional contact with the planar face; a third shaft rotatably mounted to the frame; and means for transmitting rotation between the second shaft and the third shaft, the improvement wherein the means for rotatably supporting the second shaft includes first means for supporting an end of the second shaft for pivotal movement about a transverse axis thereof, which transverse axis is perpendicular to the planar face of the disc; and second means for supporting the other end of the second shaft for selective translation in directions to pivot the second shaft about the transverse axis; and motive means, coupled to the means for rotatably supporting, for selectively translating the other end in directions to pivot the second shaft about the transverse axis, such translation causing the roller to move axially of the second shaft and radially of the disc, thereby varying the relative rotational speeds of the first and third shafts.

Thus, by pivotally supporting the second shaft carrying the roller and selectively translating the end opposite from the pivot point, a high degree of control is maintained to continuously vary the desired rotational speeds which does not put undue forces on the roller. Thus, frictional losses of power and excessive wear during such movement of the roller axially of the roller shaft are kept to a minimum.

In addition, the shaft carrying the roller is coupled to a mechanism for controlling the contact pressure between the roller and the disc to keep it to a minimum to reduce frictional losses of power and excessive wear between the roller and the disc. The force tending to make the contact between the roller and the disc is proportional to the torque transmitted by the roller and therefore does not overload the contact point therebetween.

While the present invention is especially advantageous for a hybrid vehicle that has on-board energy storage in the form of a spinning flywheel, it could apply to any case where there is a need for efficient transmission of power at varying speed ratios.

Other objects, advantages and salient features of the present invention will become apparent from the following detailed description, which, taken in conjunction with the annexed drawings, discloses a preferred embodiment of the present invention.

DRAWINGS

Referring now to the drawings which form a part of this original disclosure;

FIG. 2 is a transverse sectional view of the transmission shown in FIG. 1 taken along lines 2—2 in FIG. 1;

FIG. 3 is a fragmentary view of a portion of the transmission shown in FIG. 2 in which a valve body has been displaced from the position shown in FIG. 2 upwardly as seen in FIG. 3.

DETAILED DESCRIPTION OF THE INVENTION

Figures 1, 4:
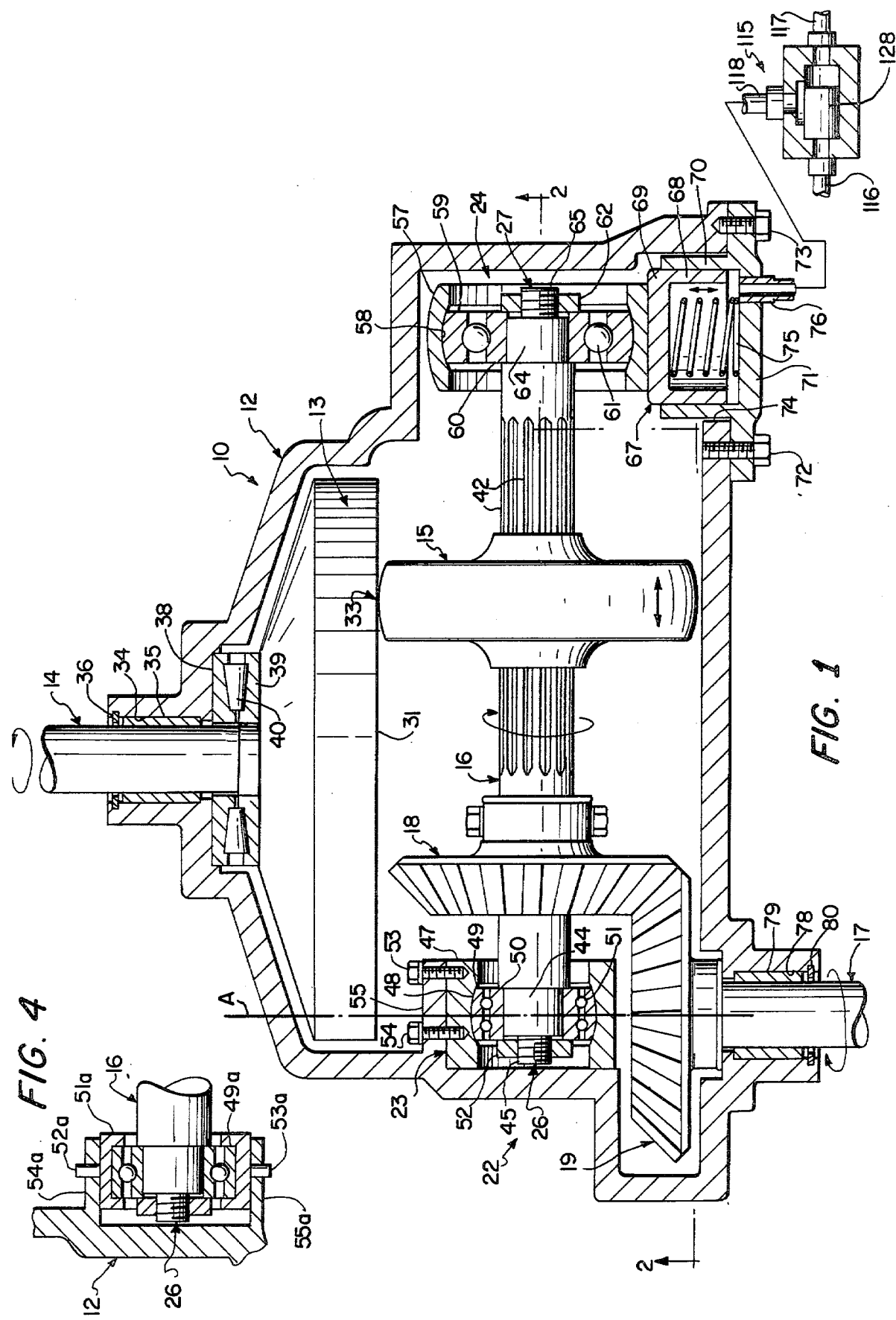
FIG. 1 is a longitudinal sectional view of the continuously variable transmission in accordance with the present invention.
FIG. 4 is a fragmentary view of a modified pivotal coupling for shaft 16.

Referring now to FIGS. 1 and 2, the continuously variable transmission 10 of the present invention includes a hollow housing or frame 12, a disc 13 mounted on a first shaft 14, a roller 15 mounted on a second shaft 16, and a third shaft 17 coupled for rotation with the second shaft 16 by means of a first bevel gear 18 coupled to the second shaft 16 and a second bevel gear 19 coupled to the third shaft. A suitable lubricant is located inside the housing 12 which is sealed.

A support assembly 22 supports the second shaft 16 for rotation inside the frame. This support assembly 22 is comprised of a first support 23 and a second support 24, with the first support 23 also supporting one end 26 of the second shaft 16 for pivotal movement about an axis A transverse to the longitudinal axis thereof and with the second support 24 also supporting the other end 27 of the second shaft 16 for selective translation in directions to pivot the second shaft about the transverse axis. As seen in FIG. 2, a motive assembly 29 is coupled to the support assembly 24 for selectively translating the other end 27 of the second shaft 16 in directions to pivot that shaft about the transverse axis. As will be described in more detail hereinafter, such pivotal movement causes the roller 15 to move axially of the second shaft 16 and thus walk radially of the disc 13 so as to vary the relative rotational speeds of the first shaft 14, the second shaft 16 and ultimately the third shaft 17 to which the second shaft is rotatably coupled.

Referring again to FIG. 1, the first shaft 14 is integrally formed with the disc 13 which has a planar face 31 in point contact, designated by reference numeral 33, with the curved periphery of roller 15. The disc 13 is cylindrical above the planar face 31 and then tapers inwardly into a frusto-conical configuration with the first shaft 14 extending upwards along the axes of the disc and the frusto-conical portion. The first shaft 14 is rotatably mounted in an aperture 34 in the frame 12 and rotates about a fixed axis. The aperture 34 has a sleeve bearing 35 located therein which receives the shaft 14, a ring 36 being located in an annular slot in the frame 12 above the top of the sleeve bearing 35 as seen in FIG. 1. An additional bearing assembly, which comprises an upper race 38 contacting the inside of the frame 12, a lower race 39 contacting the top of the frusto-conical portion of disc 13, and frusto-conical bearings 40 received between the races, aids in rotatably supporting the disc 13 and shaft 14 in the frame 12 and is capable of supporting a thrust load.

Referring now to FIGS. 1 and 2, the second shaft 16 is rotatably mounted inside the frame 12 in a position so that shafts 14 and 17 are essentially perpendicular to it and all three shafts are in the same plane. The roller 15 has a central aperture therein which is slotted to correspond with the slots or splines 42 on the outside surface of shaft 16 so that roller 15 rotates with shaft 16 but is axially movable along the shaft. The roller 15 is in frictional contact with the planar face 31 of disc 13 at the contact point 33 and therefore upon rotation of disc 13 roller 15 will rotate and visa versa.

As seen in FIGS. 1 and 2, the first bevel gear 18 is rigidly coupled to shaft 16 and rotates therewith, this first bevel gear being interconnected with the second bevel gear 19.

At end 26 of shaft 16 there is a reduced cylindrical portion 44 and a further reduced threaded end 45. This end 26 is received in the first support 23 for rotation and also for pivotal movement relative to frame 12. Thus, the first support 23 comprises an annular collar 47 with a curved, annular groove 48 on the interior surface thereof which groove receives an outer race 49 which has a curved annular outer surface corresponding to groove 48, which thereby allows pivotal motion therebetween. An inner race 50 fits snugly over the reduced portion of shaft 16, a plurality of ball bearings 51 being interposed between these races. Securing the end 26 of shaft 16 to the inner race 50 is a nut 52 threadedly received on the threaded end 45 of the shaft. As seen in FIG. 1, upon so threading nut 52 a portion thereof is in contact with the inner race 50 with the other end of that race abutting the shoulder formed between the reduced portion 44 and the remaining part of shaft 16. The collar 47 is rigidly secured to the inside of frame 12 by means of bolts 53 and 54 passing through an extension 55 extending inwardly from frame 12 and into the collar 47.

By so mounting the end 26 of shaft 16, that shaft is capable of pivotal movement about transverse axis A substantially parallel to the first shaft 14 and perpendicular to the planar face 31 of disc 13.

As seen in FIGS. 1 and 2, the other end 27 of shaft 16 is similarly mounted for rotation and also for selective translation in the second support 24. This support comprises an annular collar 57 having an internal curved, annular groove 58, an outer race 59 which has a corresponding curved annular outer surface received in groove 58, an inner race 60, a plurality of ball bearings 61 between the races, and a nut 62. The nut is threadedly received over the threaded end 65 of shaft 16. The inner race 60 receives therein the reduced portion 64 adjacent the threaded end. The bottom of the collar 57 seen in FIG. 1 is flat and is slidably supported on the flat top of a floating base or movable element 67 for selective translation in directions to pivot the shaft 16 about the transverse axis A which is perpendicular to the planar face 31 of the disc 13.

This movable element 67 is formed from a hollow sleeve 68 having a closed flat top 69 in sliding contact with the collar 57. The sleeve 68 is received and slidably movable in a supporting element 70 in the form of a hollow sleeve which is in fluid-tight contact with movable element 67. The supporting element 70 extends upwardly from a plate 71 which is coupled via bolts 72 and 73 to frame 12, the supporting element 70 being received in an aperture 74 provided in the frame 12. A tension spring 75 is interposed between the bottom of the closed top 69 of the movable element 67 and that portion of plate 71 inside the supporting element 70. A fluid port 76 passes through plate 71 and is in fluid connection with the inside of both the supporting element 70 and the movable element 67.

The third shaft 17 is rotatably received in frame 12 in aperture 78 having sleeve bearing 79 therein and retaining ring 80 near the end thereof. The second bevel gear 19 is rigidly supported on the end of shaft 17 inside the frame 12 and is coupled to the first bevel gear 18 on shaft 16. Thus, the two bevel gears provide a mechanism for rotation transmission between the second and third shafts.

The motive force for selectively translating end 27 of shaft 16 is provided by the motive assembly 29 and in particular by hydraulic cylinder 82 having a piston 83 movable therethrough, the piston being rigidly coupled to piston rod 84 which is in turn pivotally coupled to the collar 57 in the second support 24 as seen in FIG. 2 by means of a forked bracket 77 on the collar receiving a pin 81 passing through a bore in the rod. This hydraulic cylinder 82 is rigidly coupled to the frame 12 and has an aperture 85 therein allowing piston rod 84 to enter the interior of the cylinder at one end and another aperture 86 to allow the piston rod to exit from the cylinder at the other end. In the cylinder wall, there are two ports 87 and 88 which are respectively connected to flow lines 89 and 90.

As seen in FIG. 2, a speed ratio control valve 92 is associated with the piston rod 84. In particular, this control valve 92 comprises a hollow valve body 93 receiving the piston rod 84 therein via opposed apertures 94 and 95, and having a handle or valve actuator 96 extending outwardly therefrom. This actuator can for example be coupled to the accelerator pedal of an automobile. Inside the valve body 93 are two fixed, spaced rings 100 and 101 located on the outside of the piston rod 84 and in intimate contact with the inside cylindrical wall of valve body 93. A positioning spring 103 is interposed between the bottom of the valve body 93 and the top of hydraulic cylinder 82 as seen in FIG. 2. A fluid port 105 is located in the cylindrical wall of the valve body between the rings 100 and 101 in the rest or equilibrium position shown in FIG. 2, this fluid port 105 being connected via a fluid line 106 with a supply of hydraulic fluid 107 under pressure. In this rest position shown in FIG. 2, two other fluid ports 109 and 110, located in the wall of the valve body, are respectively aligned with and closed by rings 100 and 101, fluid port 109 being coupled to a fluid line 111 and fluid port 110 being coupled to fluid line 112. Two additional ports 97 and 99 in the valve body wall, above and below rings 100 and 101 as seen in FIG. 2, lead to hydraulic vents 102 and 104.

As seen in FIGS. 1–3, a contact pressure control valve 115 has a first fluid line 116 extending therefrom and into fluid connection with fluid line 111 and fluid line 89, a second fluid line 117 extending therefrom and into fluid connection with fluid line 112 and fluid line 90, and a third fluid line 118 extending therefrom into fluid connection with port 76 in plate 71 as seen in FIG. 1.

This contact pressure control valve 115 comprises a valve body 120 having a cylindrical chamber 112 with opposed ports 124 and 125 in the opposite longitudinal ends thereof in fluid connection with fluid lines 116 and 117, respectively. In addition, through the side wall of the body there is a fluid port 126 in fluid connection with fluid line 118, which port extends inwardly and expands into an enlarged recess 127 in the wall of the valve body 120 adjacent the cylindrical chamber 122. Located inside the cylindrical chamber 122 in contacting relationship is a cylindrical piston 128 which is slidable along the cylindrical chamber from one end to the other. The longitudinal extent of this piston is slightly greater than the longitudinal extent of the enlarged recess 127 so that fluid flow between fluid lines 117 and 118 on the one hand and between fluid lines 118 and 116 on the other take place on a mutually exclusive basis.

OPERATION

The basic purpose of the transmission of the present invention is to provide a continuously variable speed ratio between shafts 14 and 17, regardless of which is the driven and which is the driving shaft. In other words, the transmission can be driven in either direction.

In order to vary the relative rotational speeds of shafts 14 and 17, the radial location of the contact point of the roller 15 relative to the disc is varied. Thus, when roller 15 is moved to a greater radial position relative to the center of the flat planar face 31 of disc 13 then roller 15 and its associated shaft 16 will rotate faster, assuming shaft 14 is the driving shaft. Consequently, shaft 17 will be rotated more quickly because of the bevel gear connection between shafts 16 and 17. On the other hand, when roller 15 is axially moved along shaft 16 towards the center of disc 13, i.e., closer to the longitudinal rotational axis of the disc, then roller 15 will rotate more slowly as will shafts 16 and 17, once again assuming shaft 14 is the driving shaft. This increase and decrease of rotational speeds are the same assuming shaft 17 is the driving shaft.

In order to accomplish this axial movement of roller 15 relative to shaft 16 and therefore radial movement of roller 15 relative to disc 13, the motive assembly 29 is actuated to pivot the shaft 16 about transverse axis A. When the shaft 16 is so pivoted, the rotation of disc 13 and roller 15 automatically tend to make the roller walk axially of shaft 16 and thereby change its axial position.

This is accomplished by introducing hydraulic fluid on selected sides of piston 83 so as to move piston rod 84 which is ultimately connected to collar 57 and therefore the other end 27 of shaft 16.

This movement is instigated by manipulation of the valve handle or actuator 96 for the speed ratio control valve 92.

For example, as seen in FIG. 3, the valve body 93 has been displaced upwardly allowing hydraulic fluid to move through the valve body 93 via port 105 and out thereof via port 110, at which time the fluid flows along fluid lines 112 and 90 and then enters the hydraulic cylinder 82 via port 88 so as to push the piston rod 84 upwards as seen in FIGS. 2 and 3. This will then cause the rings 100 and 101 to move upwards and thus close off ports 109 and 110 to prevent further movement of piston rod 84. Such movement of piston rod 84 also moves or translates collar 57 and thus shaft 16 to provide the change in rotational speeds of shafts 15 and 17. In order to maintain the roller 15 at the desired radial position relative to disc 13, the shaft 16 is returned to the position in which it is substantially in the same common plane with shaft 14.

In order to maintain a sufficient but minimum contact pressure between roller 15 and disc 13 at contact point 33, the shaft 16 is acted upon by movable element 67 coupled thereto by the second support 24. The force exerted by movable element 67 on second support 24 is related and proportional to the fluid pressure in hydraulic cylinder 82, the force always being proportional to the higher of the pressures on the opposite sides of the cylinder as divided by piston 83. This is accomplished by the contact pressure control valve 115 which delivers hydraulic fluid along fluid line 118 through port 76 and into the interior of the supporting element 70 and into contact with the movable element 67, as best seen in FIG. 1. Because the sliding cylindrical piston 128 is free to move to either end of valve body 120 it will tend to be pushed by the higher pressure coming from the fluid entering either by fluid line 116 or fluid line 117. Since both of these are respectively connected to fluid lines 89 and 90 on opposite sides of piston 83 and hydraulic cylinder 82, the hydraulic fluid on either side which is under the greater pressure will tend to push the piston 128 in the necessary direction. This delivers the higher fluid pressure from the contact pressure control valve 115 towards the movable element 67 which is in turn in contact with collar 57 and thus the other end 27 of shaft 16. This will in turn tend to either increase or decrease the pressure on shaft 16 and therefore between the roller 15 thereon and disc 13 taking into consideration the compression of spring 78 between plate 71 and movable element 67.

This contact pressure is kept to a minimum but is maintained at a level above which slippage would occur between the roller and the disc. Because the contact pressure is related to the hydraulic pressure acting on movable element 67 and that hydraulic pressure is related to the hydraulic pressure in hydraulic cylinder 82, the contact pressure is related to the torque transmitted by the roller shaft 16 which is countered by the hydraulic pressure in cylinder 82. A suitable contact pressure preventing slippage can be calculated by taking into account the coefficient of friction of the roller and disc, the speeds at which the various shafts will rotate, the type of lubricant to be used inside the frame 12, the pressure of the hydraulic supply and the dimensions of rod 84, piston 83, cylinder 82 and movable element 67.

Preferably the roller and disc are metallic, for example, formed of steel alloy, in order to withstand the shock and wear of the transmission. However, they can be formed of other suitable materials.

As seen in FIG. 4, an alternate embodiment is shown for pivotally coupling the end 26 of shaft 16 to the frame 12. This comprises an outer race 49a in the form of a ring received in an internal annular groove in a support ring 51a, with ring 51a having diametrically opposed pins 52a and 53a on its outer surface received in bores in extensions 54a and 55a extending from frame 12. Pins 52a and 53a have colinear axes which are perpendicular to the planar face 31 of disc 13.

While advantageous embodiments have been chosen to illustrate the invention, it will be understood by those skilled in the art that various changes and modifications can be made therein without departing from the scope of the invention as defined in the appended claims.

What is claimed is:

1. In a continuously variable transmission of the type having
   a frame;
   a disc having a planar face;
   a first shaft rigidly coupled to said disc;
   means for coupling said first shaft to said frame for rotation about a fixed axis;
   a second shaft;
   a roller coupled to said second shaft for rotation therewith, said roller being axially movable along said second shaft;
   means, coupled to said frame, for rotatably supporting said second shaft, said roller thereon being in frictional contact with said planar face;
   a third shaft rotatably mounted to said frame; and
   means for transmitting rotation between said second shaft and said third shaft;
   the improvement wherein
   said means for rotatably supporting said second shaft includes
      first means for supporting an end of said second shaft for pivotal movement about a transverse axis thereof, which transverse axis is perpendicular to the planar face of said disc; and
      second means for supporting the other end of said second shaft for selective translation in directions to pivot said second shaft about said transverse axis; and
   motive means, coupled to said means for rotatably supporting, for selectively translating said other end in directions to pivot said second shaft about said transverse axis,
   such translation causing said roller to move axially of said second shaft, and radially of said disc, thereby varying the relative rotational speeds of said first and third shafts.

2. In a continuously variable transmission according to claim 1, wherein
   said first means for supporting comprises
      a bearing receiving said one end of said second shaft, and
      means for pivotally coupling said bearing to said frame.

3. In a continuously variable transmission according to claim 2, wherein
   said bearing has a curved, annular outer surface, and said means for pivotally coupling has a curved, annular groove for pivotally receiving said curved, annular outer surface.

4. In a continuously variable transmission according to claim 1, wherein
said second means for supporting comprises
a bearing receiving said other end of said second shaft, and
said bearing being coupled to said motive means.

5. In a continuously variable transmission according to claim 1, wherein
said motive means comprises a hydraulic cylinder having a piston movable therethrough.

6. In a continuously variable transmission according to claim 1, wherein
said motive means comprises
a hydraulic cylinder, coupled to said frame,
a piston movable in said hydraulic cylinder, and
a piston rod interconnecting said piston and said second means for supporting.

7. In a continuously variable transmission according to claim 6, wherein
said motive means further comprises
a hydraulic valve, coupled to said piston, for selectively driving said piston longitudinally along said hydraulic cylinder.

8. In a continuously variable transmission according to claim 2, wherein
said means for pivotally coupling comprises a pair of pins having colinear axes received, respectively, in a pair of bores.

9. In a continuously variable transmission according to claim 1, and further comprising
means, coupled to said frame, for controlling the contact pressure between said roller and said disc.

10. In a continuously variable transmission according to claim 9, wherein
said means for controlling is coupled to said motive means and responsive thereto.

11. In a continuously variable transmission according to claim 9, wherein
said means for controlling comprises a hydraulically-activated movable element coupled to said frame.

12. In a continuously variable transmission according to claim 9, wherein
said means for controlling comprises
a movable element contacting said second means for supporting.

13. In a continuously variable transmission according to claim 12, wherein
said means for controlling comprises
a hydraulic valve,
a hollow supporting element receiving said movable element, and
means for conducting hydraulic fluid from said valve into said hollow supporting element and into contact with said movable element.

14. In a continuously variable transmission according to claim 1, wherein
said motive means comprises
a hydraulic cylinder having a piston movable therethrough, and
further comprising means, coupled to said frame, for controlling the contact pressure between said roller and said disc,
said means for controlling comprising
a hydraulically-activated movable element, and
means for hydraulically connecting said hydraulically-activated movable element to said hydraulic cylinder.

15. In a continuously variable transmission of the type having
a frame;
a disc having a planar face;
a first shaft rigidly coupled to said disc;
means for coupling said first shaft to said frame for rotation about a fixed axis;
a second shaft;
a roller coupled to said second shaft for rotation therewith, said roller being axially movable along said second shaft;
means, coupled to said frame, for rotatably supporting said second shaft, said roller thereon being in frictional contact with said planar face;
a third shaft rotatably mounted to said frame;
means for transmitting rotation between said second shaft and said third shaft; and
means for moving said roller axially of said second shaft and radially of said disc,
the improvement comprising:
means, coupled to and responsive to said means for moving, for controlling the contact pressure between said roller and said disc.

16. In a continuously variable transmission according to claim 15, wherein
said means for moving comprises a hydraulic cylinder, and
said means for controlling is responsive to the hydraulic pressure in said hydraulic cylinder.

* * * * *